(12) United States Patent
El-Saban et al.

(10) Patent No.: US 8,661,030 B2
(45) Date of Patent: Feb. 25, 2014

(54) RE-RANKING TOP SEARCH RESULTS

(75) Inventors: Motaz Ahmad El-Saban, Cairo (EG); Christopher John Champness Burges, Bellevue, WA (US); Qiang Wu, Sammamish, WA (US)

(73) Assignee: Microsoft Corporation, Redmond, WA (US)

( * ) Notice: Subject to any disclaimer, the term of this patent is extended or adjusted under 35 U.S.C. 154(b) by 725 days.

(21) Appl. No.: 12/421,022

(22) Filed: Apr. 9, 2009

(65) Prior Publication Data

US 2010/0262612 A1 Oct. 14, 2010

(51) Int. Cl.
*G06F 17/30* (2006.01)
(52) U.S. Cl.
USPC .......................... 707/723; 707/760
(58) Field of Classification Search
USPC ................ 707/752, 723, 760; 715/753
See application file for complete search history.

(56) References Cited

U.S. PATENT DOCUMENTS

| | | | |
|---|---|---|---|
| 5,493,692 A | 2/1996 | Theimer et al. | |
| 5,544,321 A | 8/1996 | Theimer et al. | |
| 5,555,376 A | 9/1996 | Theimer et al. | |
| 5,603,054 A | 2/1997 | Theimer et al. | |
| 5,611,050 A | 3/1997 | Theimer et al. | |
| 5,625,751 A | 4/1997 | Brandwajn et al. | |
| 5,649,068 A | 7/1997 | Boser et al. | |
| 5,812,865 A | 9/1998 | Theimer et al. | |
| 6,038,561 A * | 3/2000 | Snyder et al. .......... | 1/1 |
| 6,202,062 B1 | 3/2001 | Cameron et al. | |
| 6,260,013 B1 | 7/2001 | Sejnoha | |
| 6,353,398 B1 | 3/2002 | Amin et al. | |
| 6,466,232 B1 | 10/2002 | Newell et al. | |
| 6,490,577 B1 | 12/2002 | Anwar | |
| 6,513,046 B1 | 1/2003 | Abbott, III et al. | |
| 6,526,440 B1 | 2/2003 | Bharat | |
| 6,549,915 B2 | 4/2003 | Abbott, III et al. | |
| 6,636,860 B2 | 10/2003 | Vishnubhotla | |

(Continued)

FOREIGN PATENT DOCUMENTS

| | | |
|---|---|---|
| JP | 2000099080 | 4/2000 |
| JP | 2003228581 | 8/2003 |

(Continued)

OTHER PUBLICATIONS

U.S. Appl. No. 12/389,187, filed Feb. 19, 2009, Kenneth H. Abbott, Dan Newell, James O. Robarts, and Ken Swapp, "Supplying Enhanced Computer User's Context Data".

(Continued)

*Primary Examiner* — Jean M Corrielus
(74) *Attorney, Agent, or Firm* — Stephen A. Wight; Douglas J. Barker; Micky Minhas

(57) ABSTRACT

The claimed subject matter provides a system and/or a method that facilitates generating sorted search results for a query. An interface component can receive a query in a first language. A first ranker can be trained from a portion of data related to a second language. A second ranker can correspond to the first language, wherein the second ranker is untrained due to a limited amount of data related to the first language. A sorting component can invoke the first ranker to generate and order a pre-defined number of search results for the received query and subsequently invoke the second ranker to the pre-defined number of search results to generate a re-ordered number of search results in the first language for the received query.

19 Claims, 10 Drawing Sheets

(56) References Cited

U.S. PATENT DOCUMENTS

| | | | |
|---|---|---|---|
| 6,672,506 B2 | 1/2004 | Swartz et al. | |
| 6,691,106 B1 | 2/2004 | Sathyanarayan | |
| 6,738,678 B1 | 5/2004 | Bharat et al. | |
| 6,741,188 B1 | 5/2004 | Miller et al. | |
| 6,747,675 B1 | 6/2004 | Abbott et al. | |
| D494,584 S | 8/2004 | Schlieffers et al. | |
| 6,785,676 B2 | 8/2004 | Oblinger | |
| 6,791,580 B1 | 9/2004 | Abbott et al. | |
| 6,796,505 B2 | 9/2004 | Pellaumail et al. | |
| 6,801,223 B1 | 10/2004 | Abbott et al. | |
| 6,812,937 B1 | 11/2004 | Abbott et al. | |
| 6,837,436 B2 | 1/2005 | Swartz et al. | |
| 6,842,877 B2 | 1/2005 | Robarts et al. | |
| 6,873,990 B2 | 3/2005 | Oblinger | |
| 6,883,019 B1 | 4/2005 | Sengupta et al. | |
| 6,968,333 B2 | 11/2005 | Abbott et al. | |
| 7,003,513 B2 | 2/2006 | Geiselhart | |
| 7,010,501 B1 | 3/2006 | Roslak et al. | |
| 7,031,961 B2 | 4/2006 | Pitkow et al. | |
| 7,039,631 B1 * | 5/2006 | Finger, II | 1/1 |
| 7,040,541 B2 | 5/2006 | Swartz et al. | |
| 7,063,263 B2 | 6/2006 | Swartz et al. | |
| 7,162,473 B2 | 1/2007 | Dumais et al. | |
| 7,171,378 B2 | 1/2007 | Petrovich et al. | |
| 7,195,157 B2 | 3/2007 | Swartz et al. | |
| 7,249,058 B2 | 7/2007 | Kim et al. | |
| 7,281,002 B2 | 10/2007 | Farrell | |
| 7,305,381 B1 | 12/2007 | Poppink et al. | |
| 7,310,636 B2 | 12/2007 | Bodin et al. | |
| 7,363,294 B2 | 4/2008 | Billsus et al. | |
| 7,385,501 B2 | 6/2008 | Miller et al. | |
| 7,451,131 B2 | 11/2008 | Curtis et al. | |
| 7,472,096 B2 | 12/2008 | Burges et al. | |
| 7,505,961 B2 * | 3/2009 | Finger, II | 1/1 |
| 7,512,678 B2 | 3/2009 | Crabtree et al. | |
| 7,525,450 B2 | 4/2009 | Miller et al. | |
| 7,574,436 B2 * | 8/2009 | Kapur et al. | 1/1 |
| 7,617,164 B2 | 11/2009 | Burges et al. | |
| 7,698,270 B2 * | 4/2010 | Brave et al. | 707/603 |
| 7,702,690 B2 * | 4/2010 | Brave et al. | 707/776 |
| 7,779,019 B2 * | 8/2010 | Burges | 707/758 |
| 8,255,827 B2 * | 8/2012 | Malik | 715/789 |
| 2001/0030664 A1 | 10/2001 | Shulman et al. | |
| 2001/0040590 A1 | 11/2001 | Abbott et al. | |
| 2001/0040591 A1 | 11/2001 | Abbott et al. | |
| 2001/0043231 A1 | 11/2001 | Abbott et al. | |
| 2001/0043232 A1 | 11/2001 | Abbott et al. | |
| 2002/0032689 A1 | 3/2002 | Abbott, III et al. | |
| 2002/0044152 A1 | 4/2002 | Abbott, III et al. | |
| 2002/0052930 A1 | 5/2002 | Abbott et al. | |
| 2002/0052963 A1 | 5/2002 | Abbott et al. | |
| 2002/0054130 A1 | 5/2002 | Abbott, III et al. | |
| 2002/0054174 A1 | 5/2002 | Abbott et al. | |
| 2002/0069190 A1 | 6/2002 | Geiselhart | |
| 2002/0078204 A1 | 6/2002 | Newell et al. | |
| 2002/0080155 A1 | 6/2002 | Abbott et al. | |
| 2002/0080156 A1 | 6/2002 | Abbott et al. | |
| 2002/0083025 A1 | 6/2002 | Robarts et al. | |
| 2002/0083158 A1 | 6/2002 | Abbott et al. | |
| 2002/0087525 A1 | 7/2002 | Abbott et al. | |
| 2002/0099817 A1 | 7/2002 | Abbott et al. | |
| 2002/0152190 A1 | 10/2002 | Biebesheimer et al. | |
| 2002/0188589 A1 | 12/2002 | Salmenkaita et al. | |
| 2003/0046401 A1 | 3/2003 | Abbott et al. | |
| 2003/0154476 A1 | 8/2003 | Abbott, III et al. | |
| 2003/0187844 A1 | 10/2003 | Li et al. | |
| 2003/0207278 A1 | 11/2003 | Khan et al. | |
| 2003/0225750 A1 | 12/2003 | Farahat et al. | |
| 2003/0236662 A1 | 12/2003 | Goodman | |
| 2004/0044658 A1 | 3/2004 | Crabtree et al. | |
| 2004/0199419 A1 | 10/2004 | Kim et al. | |
| 2004/0201500 A1 | 10/2004 | Miller et al. | |
| 2004/0260695 A1 | 12/2004 | Brill | |
| 2005/0034078 A1 | 2/2005 | Abbott et al. | |
| 2005/0049990 A1 | 3/2005 | Milenova et al. | |
| 2005/0086243 A1 | 4/2005 | Abbott et al. | |
| 2005/0125390 A1 | 6/2005 | Hurst-Hiller et al. | |
| 2005/0144158 A1 | 6/2005 | Capper et al. | |
| 2005/0222981 A1 | 10/2005 | Lawrence et al. | |
| 2005/0246321 A1 | 11/2005 | Mahadevan et al. | |
| 2005/0266858 A1 | 12/2005 | Miller et al. | |
| 2006/0010206 A1 | 1/2006 | Apacible et al. | |
| 2006/0019676 A1 | 1/2006 | Miller et al. | |
| 2006/0195406 A1 | 8/2006 | Burges et al. | |
| 2006/0195440 A1 | 8/2006 | Burges et al. | |
| 2006/0200556 A1 * | 9/2006 | Brave et al. | 709/224 |
| 2006/0206476 A1 * | 9/2006 | Kapur et al. | 707/5 |
| 2007/0006098 A1 | 1/2007 | Krumm et al. | |
| 2007/0016553 A1 | 1/2007 | Dumais et al. | |
| 2007/0043706 A1 | 2/2007 | Burke et al. | |
| 2007/0071209 A1 | 3/2007 | Horvitz et al. | |
| 2007/0112720 A1 | 5/2007 | Cao et al. | |
| 2007/0124297 A1 | 5/2007 | Toebes | |
| 2007/0150466 A1 * | 6/2007 | Brave et al. | 707/5 |
| 2008/0040314 A1 * | 2/2008 | Brave et al. | 707/2 |
| 2008/0090591 A1 | 4/2008 | Miller et al. | |
| 2008/0091537 A1 | 4/2008 | Miller et al. | |
| 2008/0104004 A1 * | 5/2008 | Brave et al. | 706/45 |
| 2008/0161018 A1 | 7/2008 | Miller et al. | |
| 2008/0183699 A1 * | 7/2008 | Hu et al. | 707/5 |
| 2008/0189257 A1 * | 8/2008 | Wiseman et al. | 707/4 |
| 2008/0319727 A1 | 12/2008 | Horvitz et al. | |
| 2009/0006297 A1 | 1/2009 | Horvitz et al. | |
| 2009/0055752 A1 | 2/2009 | Abbott et al. | |
| 2009/0231268 A1 | 9/2009 | Yamada | |
| 2011/0258049 A1 * | 10/2011 | Ramer et al. | 705/14.66 |

FOREIGN PATENT DOCUMENTS

| | | |
|---|---|---|
| JP | 2003296737 | 10/2003 |
| WO | WO9800787 A1 | 1/1998 |
| WO | WO02057961 | 7/2002 |
| WO | WO03079688 | 9/2003 |

OTHER PUBLICATIONS

Baum, et al. "Supervised Learning of Probability Distributions by Neural Networks" (1988) Neural Information Processing Systems, pp. 52-61.

M. Billinghurst, et al., "An Evaluation of Wearable Information Spaces," Proceedings of the Virtual Reality Annual International Symposium, Mar. 1998, 8 pages.

Mark Billing Hurst, Research Directions in Wearable Computing, University of Washington, May 1998, 48 pages.

Mark Billinghurst, "Research Directions in Wearable Computing," University of Washington, May 1998, 48 pages.

Mark Billing Hurst, et al., Wearable Devices: New Ways to Manage Information, IEEE Computer Society, Jan. 1999, pp. 57-64.

Bradley, et al. "The Rank Analysis of Incomplete Block Designs 1: The Method of Paired Comparisons" Biometrika (1052) 39, pp. 324-245.

Bromley, et al. "Signature Verification Using 'Siamese' Time Delay Nural Network." (1993) Advances in Pattern Recognition Systems Using Neural Network Technologies, World Scientific, pp. 25-44.

C. Burges, et al, "Learning to Rank Using Gradient Descent", Proceedings of the 22nd international conference on Machine learning, ACM International Conference Proceeding Series; 2005, pp. 89-96, vol. 119, Bonn, Germany.

C. Burges, "Ranking as Learning Structured Outputs", in Proceedings of the NIPS 2005 Workshop on Learning to Rank, Dec. 2005, 4 pages. D.

Burges, C. "Simplified Support Vector Decision Rules" (1996) International Conference on Machine Learning, pp. 71-77.

Caruana, et al. "Using the Future to 'Sort Out' the Present: Rankprop and Multitask Learning for Medical Risk Evaluation" (1996) NIPS, pp. 959-965.

Guanling Chen, et al., "Survey of Context-Aware Mobile Computing Research," Dartmouth Computer Science Technical Report, Nov. 30, 2000, 16 pages.

(56) References Cited

OTHER PUBLICATIONS

The Chinese Office Action mailed Mar. 27, 2012 for Chinese patent application No. 200680045523.1, a counterpart foreign application of US patent No. 7,689,615, 6 pages.
Cohen, et al., "Volume Seedlings", 1992. 8 pages.
Crammer, et al. "Pranking with Ranking" (2001) NIPS, 7 pages.
Dekel, et al. "Log-linear Models for Label-ranking" (2004) NIPS, 8 pages.
The European Office Action mailed Apr. 27, 2012 for European patent application No. 06100437.0, a counterpart foreign application of US patent application No. 7,689,520, 7 pages.
Freund et al. "An Efficient Boosting Algorithm for Combining Preferences", J. of Machine Learning Research 4 (2003), pp. 933-969.
Freund, et al. "An Efficient Boosting Algorithm for Combining Preferences" (1999) 9 pages.
Harrington, E. "Online ranking/collaborative filtering Using Perceptron Algorithm" (2003) ICNL, 8 pages.
Andy Harter, et al., "A Distributed Location System for the Active Office," IEEE Network, 1994, pp. 62-70.
Hastie, et al. "Classification by Pairwise Coupling" (1998) NIPS, pp. 451-471.
Herbrich, et al. "Large Margin Rank Boundaries for Ordinal Regression" (2000) Advances in Large Margin Classifiers, pp. 115-132.
Eric Horvitz, et al., "Attention-Sensitive Alerting in Computing Systems," Microsofl Research, Aug. 1999. 26 pages.
Eric Horvitz, et al., "In Pursuit of Effective Handsfree Decision Support: Coupling Bayesian Inference, Speech Understanding, and User Models," 1995, 8 pages.
International Search Report and Written Opinion dated Mar. 6, 2008 for PCT Application Serial No. PCT/US06/26266, 11 Pages.
International Search Report dated Sep. 29,2003 for PCT Application Serial No. 00/20685, 3 Pages.
Jarvelin, et al., Cumulated Gain-Based Evaluation of IR Techniques, 2002. 25 pages.
Jarvelin, et al. "IR Evaluation Methods for Retrieving Highly Relevant Documents" (2000) Proceedings of the 23rd annual ACM SIGIR, pp. 41-48.
Joachims. "Optimizing Search Engines using Clickthrough Data" ACM SIGKDD 02, Edmonton, Alberta, Canada. pp. 133-142. Last accessed Jun. 26, 2008, 10 pages.
T. Joachims, "Text categorization with support vector machines: learning with many relevant features," Machine Learning, European Conference on Machine Learning, Apr. 21, 1998, pp. 137-142.
Translated Japanese Office Action mailed Jan. 24, 2012 for Japanese patent application No. 2006-039909, a counterpart foreign application of US patent No. 7,689,520, 7 pages.
Kimeldorf, et al., "Some results on Tchebycheffian Spline Functions" J. Mathematical Analysis and Applications, 1971, vol. 33, pp. 82-95.
Robert M. Losee, Jr., "Minimizing information overload: the ranking of electronic messages," Journal of Information Science 15, Elsevier Science Publishers B.V., 1989, pp. 179-189.
Mason, et al. "Boosting Algorithms as Gradient Descent" (2000) NIPS 7 pages.
Mitchell. "Machine Learning" New York: McGraw-Hill. 58 pages.
OA dated Jun. 26, 2008 for U.S. Appl. No. 11/378,086, 27 pages.
OA Dated Oct. 31, 2008 for U.S. Appl. No. 11/426,981, 21 pages.
OA Dated Dec. 11, 2008 for U.S. Appl. No. 11/378,086, 28 pages.
OA dated Dec. 9, 2008 for U.S. Appl. No. 11/066,514, 27 pages.
OA Dated Jul. 11, 2008 for U.S. Appl. No. 11/066,514, 26 pages.
OA Dated Oct. 31, 2008 for U.S. Appl. No. 11/426,981, 31 pages.
Office Action for U.S. Appl. No. 11/426,981, mailed on May 5, 2011, Susan T. Dumais, "Context-Based Search, Retrieval, and Awareness".
Non-Final Office Action for U.S. Appl. No. 11/426,981, mailed on Oct. 6, 2011, Susan Dumais, "Context-Based Search, Retrieval, and Awareness", 24 pages.
Office Action for U.S. Appl. No. 11/426,981, mailed on Mar. 23, 2012, Susan T. Dumais, "Context-Based Search, Retrieval, and Awareness", 24 pgs.
Orr, et al. "Neural Networks: Tricks of the Trade", Springer, 1998. 55 pages.
Refregier, et a l. "Probabilistic Approach for Multiclass Classification with Neural Networks" (1991) Proceedings of the 1991 International Conference on Artificial Neural Networks (ICANN—91) 5 pages.
Bradley J. Rhodes, "Remembrance Agent: A continuously running automated information retrieval system," The Proceedings of the First International Conference on the Practical Application of Intelligent Agents and Multi Agent Technology, 1996, pp. 487-495.
Bradley J. Rhodes, The Wearable Remembrance Agent: A System for Augmented Memory, Personal Technologies Journal Special Issue on Wearable Computing, 1997, 12 pages.
Bradley J. Rhodes, "The Wearable Remembrance Agent: A System for Augmented Theory," The Proceedings of the First International Symposium on Wearable Computers, Oct. 1997, pp. 123-128.
Roy Want, et al., The Active Badge Location System, ACM Transactions on Information Systems, Jan. 1992, pp. 91-102, vol. 10—No. 1.
William Noah Schilit, "A System Architecture for Context-Aware Mobile Computing," Columbia University, 1995, 153 pages.
Bill Schilit, et al., "Context-Aware Computing Applications," In Proceedings of the Workshop on Mobile Computing Systems and Applications, Dec. 1994. pp. 85-90.
Bill N. Schilit, et al., "Customizing Mobile Applications," Proceedings USENIX Symposium on Mobile and Location Independent Computing, Aug. 1993,9 pages.
Bill N. Schilit, et al., "Disseminationg Active Map Information to Mobile Hosts," IEEE Network, 1994, pp. 22-32, vol. 8—No. 5.
Bill N. Schilit, et al., "The ParcTab Mobile Computing System," IEEE WWOS-IV, 1993, 4 pages.
B. Scholkopf, et al., "Learning with Kernels", MIT Press, 2002. 648 pages.
Mike Spreitzer, et al., Architectural Considerations for Scalable, Secure, Mobile Computing with Location Information, in the 14th International Conference on Distributed Computing Systems, Jun. 1994, pp. 29-38.
Mike Spreitzer, et al., "Providing Location Information in a Ubiquitous Computing Environment," SIGOPS '93, 1993, pp. 270-283.
Mike Spreitzer et al., Scalable, Secure, Mobile Computing with Location Information, Communications of the ACM, Jul. 1993, 1 page, vol. 36—No. 7.
Thad Eugene Starner, "Wearable Computing and Contextual Awareness," Massachusetts Institute of Technology, Jun. 1999,248 pages.
Storn, et al., "Differential Evolution—A Simple and Efficient Heuristic for Global Optimization over Continuous Spaces", 1996. 19 pages.
Storn, "On the Usage of Differential Evolution for Function Optimization", 2002. 5 pages.
Marvin Theimer, et al., "Operating System Issues for PDAs," In Fourth Workshop on Workstation Operating Systems, 1993, 7 pages.
Roy Want, "Active Badges and Personal Interactive Computing Objects," IEEE Transactions on Consumer Electronics, 1992, I 1 pages, vol. 38—No. 1.
Mark Weiser, "Some Computer Science Issues in Ubiquitous Computing," Communications of the ACM, Jul. 1993, pp. 75-84, vol. 36—No. 7.
Mark Weiser, "The Computer for the 21st Century, Scientific American," Sep. 1991, 8 pages.
Workshop on Wearable Computing Systems, Aug. 19-21, 1996.
Xia, et al., "A One-Layer Recurrent Neural Network for Support Vector Machine Learning", 2004.

\* cited by examiner

RE-RANKING TOP SEARCH RESULTS

CROSS-REFERENCE TO RELATED APPLICATIONS

This application is related to pending U.S. patent application Ser. No. 11/294,269 entitled "IMPROVING RANKING RESULTS USING MULTIPLE NESTED RANKING" filed on Dec. 5, 2005. The entirety of the above-noted application is incorporated by reference herein.

BACKGROUND

In many instances, a search engine is utilized to search for information. In general, a search engine is a special program (e.g., computer executable instructions) designed to help find files (e.g., web pages, images, text . . . ) stored on a computer, for example, a public server or on one's own personal computer. A typical search engine allows a user to invoke a query for files that satisfy particular criteria, for example, files that contain a given word or phrase in a title or body. Web search engines generally work by storing information about a large number of web pages retrieved from the World Wide Web (WWW) through a web crawler, or an automated web browser, which follows essentially every link it locates. The contents of each web page are then analyzed to determine how it should be indexed, for example, words can be extracted from the titles, headings, or special fields called meta-tags. Data about web pages is stored in an index database for use in later queries. Some search engines store (or cache) all or part of a source page as well as information about the web pages. When a user invokes a query through the web search engine by providing key words, the web search engine looks up the index and provides a listing of web pages that best-match the criteria, usually with a short summary containing the document's title and/or parts of the text.

In general, the usefulness of a search engine depends on the relevance of the results it presents to a user and the presentation of such results. While there can be numerous web pages that include a particular word or phrase, some web pages may be more relevant, popular, or authoritative than others. Most search engines employ methods to rank the results to provide a "best" result first. How a search engine decides which pages are the best matches, and what order the results should be shown in, varies widely from one engine to another.

There has been much focus on tier one markets such as the United States and France in terms of searching as a web service. While this is justifiable from an immediate business point of view, as companies try to enter new markets, they would have to offer competitive quality for a search engine in native languages. One major aspect in serving high quality query results is the ability to do effective ranking of web documents by surfacing up relevant documents from a user standpoint. For scalability and performance reasons, many current web document ranking approaches use machine learning techniques to learn the mapping between query-document pairs and the degree of relevance as judged by users. Yet, these data driven approaches require large amounts of training data for satisfactory performance. For popular or more widespread languages, there is typically enough resources and justification to collect and maintain high quality training data. However, less popular or used languages do not have sufficient amounts of training data to provide satisfactory performance to provide search results.

SUMMARY

The following presents a simplified summary of the innovation in order to provide a basic understanding of some aspects described herein. This summary is not an extensive overview of the claimed subject matter. It is intended to neither identify key or critical elements of the claimed subject matter nor delineate the scope of the subject innovation. Its sole purpose is to present some concepts of the claimed subject matter in a simplified form as a prelude to the more detailed description that is presented later.

The subject innovation relates to systems and/or methods that facilitate identifying search results for a query utilizing cascading ranking structures. A sorting component can employ a cascading ranking structure in order to provide relevant search results for a particular language (e.g., market, market segment, etc.) to which training data for a ranker is insufficient. In other words, the sorting component can combine a first ranker and a second ranker in order to generate search results. The first ranker is trained using data from a language disparate than that of the query, while the second ranker is trained on data from the same language of the query. The sorting component utilizes a hybrid training set of data from the first ranker and the second ranker in order to alleviate the deficiencies of the second ranker (e.g., the second ranker may not be experimentally proven to provide relevant search results). Thus, the amount of training data for the second ranker is less than the amount of training data for the first ranker and the sorting component mitigates lack of training data for the second ranker by cascading the first ranker with the second ranker.

The subject innovation can further include a query evaluator that can identify a first language of the received query. For example, the query evaluator can detect the language of the query (e.g., automatically), identify the closest first ranker to the language of the query, and the like. A ranker selector can further invoke at least two rankers based upon the evaluation of the query evaluator. In general, the ranker selector can combine and cascade at least two rankers in order to provide search results and mitigate a lack of training data for a ranker corresponding to the language of the query. Moreover, the sorting component can be implemented with a search engine in order to provide search results related to a data search on the Internet, a server, a database, a website, a network, and the like. In other aspects of the claimed subject matter, methods are provided that facilitate identifying search results for a query utilizing cascading ranking structures.

The following description and the annexed drawings set forth in detail certain illustrative aspects of the claimed subject matter. These aspects are indicative, however, of but a few of the various ways in which the principles of the innovation may be employed and the claimed subject matter is intended to include all such aspects and their equivalents. Other advantages and novel features of the claimed subject matter will become apparent from the following detailed description of the innovation when considered in conjunction with the drawings.

DETAILED DESCRIPTION

Figure 1:
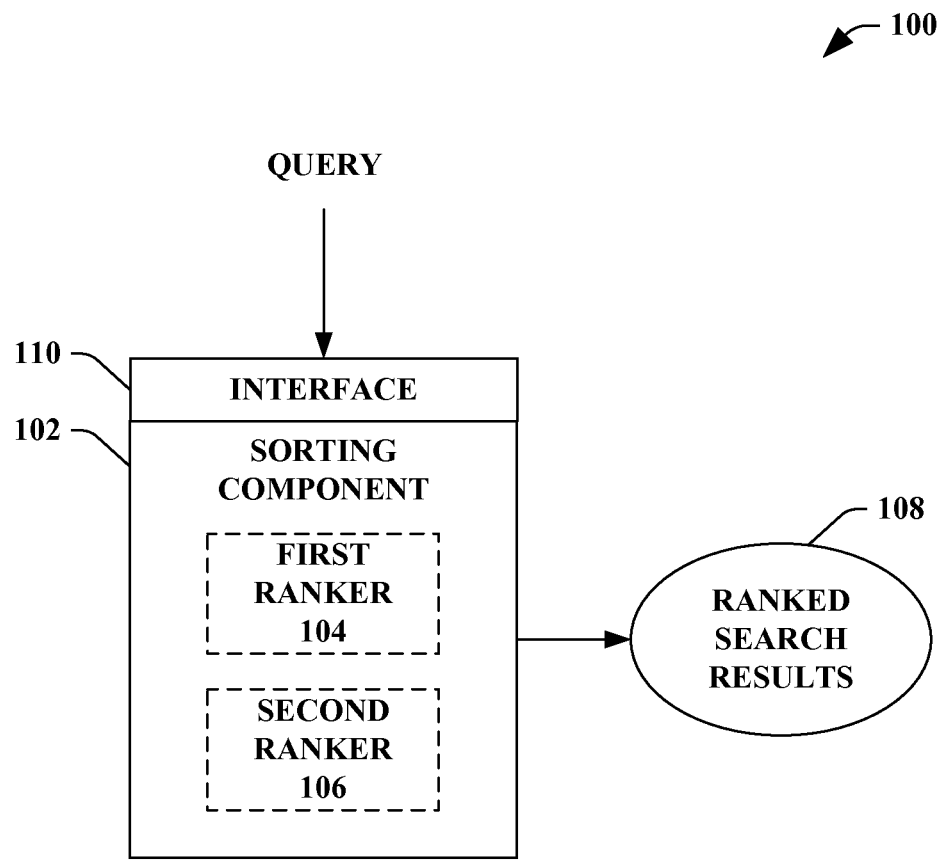
FIG. 1 illustrates a block diagram of an exemplary system that facilitates identifying search results for a query utilizing cascading ranking structures.

The claimed subject matter is described with reference to the drawings, wherein like reference numerals are used to refer to like elements throughout. In the following description, for purposes of explanation, numerous specific details are set forth in order to provide a thorough understanding of the subject innovation. It may be evident, however, that the claimed subject matter may be practiced without these specific details. In other instances, well-known structures and devices are shown in block diagram form in order to facilitate describing the subject innovation.

As utilized herein, terms "component," "system," "ranker," "engine," "evaluator," "selector," and the like are intended to refer to a computer-related entity, either hardware, software (e.g., in execution), and/or firmware. For example, a component can be a process running on a processor, a processor, an object, an executable, a program, a function, a library, a subroutine, and/or a computer or a combination of software and hardware. By way of illustration, both an application running on a server and the server can be a component. One or more components can reside within a process and a component can be localized on one computer and/or distributed between two or more computers.

Furthermore, the claimed subject matter may be implemented as a method, apparatus, or article of manufacture using standard programming and/or engineering techniques to produce software, firmware, hardware, or any combination thereof to control a computer to implement the disclosed subject matter. The term "article of manufacture" as used herein is intended to encompass a computer program accessible from any computer-readable device, carrier, or media. For example, computer readable media can include but are not limited to magnetic storage devices (e.g., hard disk, floppy disk, magnetic strips . . . ), optical disks (e.g., compact disk (CD), digital versatile disk (DVD) . . . ), smart cards, and flash memory devices (e.g., card, stick, key drive . . . ). Additionally it should be appreciated that a carrier wave can be employed to carry computer-readable electronic data such as those used in transmitting and receiving electronic mail or in accessing a network such as the Internet or a local area network (LAN). Of course, those skilled in the art will recognize many modifications may be made to this configuration without departing from the scope or spirit of the claimed subject matter. Moreover, the word "exemplary" is used herein to mean serving as an example, instance, or illustration. Any aspect or design described herein as "exemplary" is not necessarily to be construed as preferred or advantageous over other aspects or designs.

Now turning to the figures, FIG. 1 illustrates a system 100 that facilitates identifying search results for a query utilizing cascading ranking structures. The system 100 can include a sorting component 102 that can receive a query via an interface component 110 (herein referred to as "the interface 110") and provide ranked search results 108 that are relevant to the query. In particular, the sorting component 102 can utilize a first ranker 104 and a second ranker 106 in order to provide cascading ranking structures to generate the ranked search results 108. By implementing cascading ranking structures, the system 100 can generate ranked search results 108 for a query received in a language (e.g., market, market segment, etc.) in which a ranker for such language that does not include sufficient training data. Thus, queries received in languages that are less popular or used less frequently can be processed to provide query results regardless and independent of the amount of training data for a ranker. Moreover, it is to be appreciated that a language can also include a market, a market segment, and the like.

The sorting component 102 can receive the query in a first language and utilize the first ranker 104 to provide ordered search results, wherein the first ranker 104 is based upon training data related to a second language (e.g., disparate from the language related to the received query). The sorting component 102 can utilize the second ranker 106 to provide ranked search results 108 from a pre-defined number of the ordered searched results, wherein the second ranker 106 is related to the first language (e.g., the language of the received query). By utilizing the first ranker 104 associated with a second language and the second ranker 106 associated with the language related to the query, the ranked search results 108 can be identified independent of the amount of training data for the second ranker 106. In general, the system 100 can allow a ranker (related to a language of the received query) with limited training data to be employed with a query to provide ranked search results 108 by leveraging a ranker (related to a disparate language of the received query) that includes sufficient amount of training data. It is to be appreciated that the sorting component 102 can employ any suitable (e.g., suitable in terms of language characteristics, user behavior in the market, etc.) first ranker 104 related to a second language and any suitable second ranker 106 related to a first language such that the first ranker 104 utilizes a first set of training data that is usually more than a second set of training data associated with the second ranker 106.

For example, a query can be in the Arabic language to which there may not be sufficient training data for a ranker to provide ordered search results. Yet, a ranker related to a more common language such as English, can be trained with sufficient amounts of data to provide relevant and ordered search results. The subject innovation can combine the use of a ranker related to the English language to generate a first set of ordered search results for the query in the Arabic language and subsequently utilize a ranker related to the Arabic language on the first set of ordered search results to provide ranked search results for the query. For instance, a number of the search results provided by the English ranker can be invoked with the Arabic ranker in order to provide relevant and ranked search results. It is to be appreciated that the amount of training data for the Arabic ranker can be insufficient (e.g., not experimentally proven to provide relevant search results) and such insufficiency of the Arabic ranker can be alleviated by the use of the English ranker (which has been trained sufficiently).

Additionally, it is to be appreciated that the sorting component 102 can employ the re-ordering (manifested by the second ranker 106) on a client side for improved privacy. Moreover, the second ranker 106 can utilize specific features from the language of the query (features that are different from that used for the first ranker 104).

In addition, the system 100 can include any suitable and/or necessary interface 110, which provides various adapters, connectors, channels, communication paths, etc. to integrate the sorting component 102 into virtually any operating and/or database system(s) and/or with one another. In addition, the interface 110 can provide various adapters, connectors, channels, communication paths, etc., that provide for interaction with the sorting component 102, the first ranker 104, the second ranker 106, the ranked search results 108, and any other device and/or component associated with the system 100.

Figure 2:
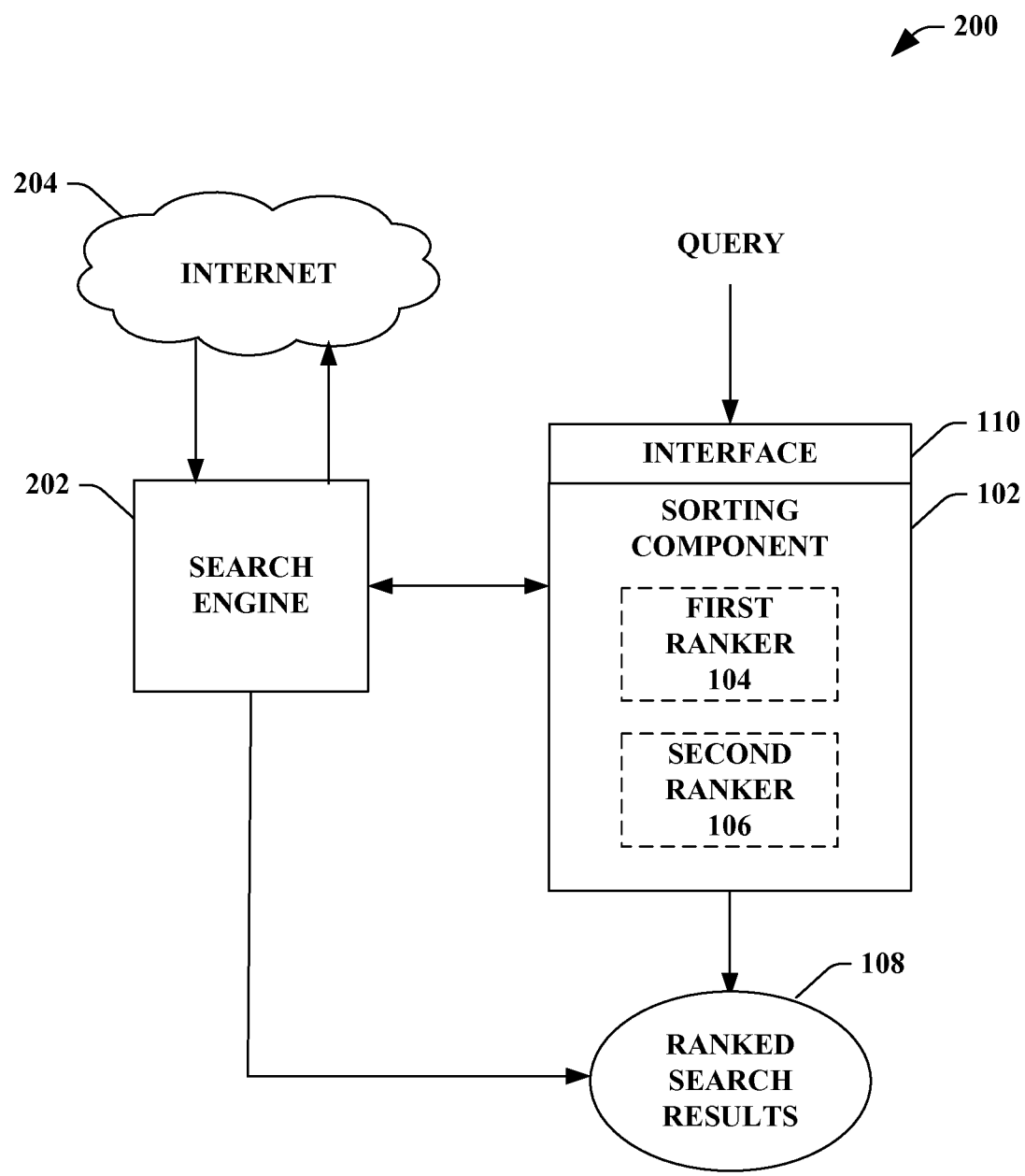
FIG. 2 illustrates a block diagram of an exemplary system that facilitates enhancing a search engine by employing hybrid training data with web rankers.

FIG. 2 illustrates a system 200 that facilitates enhancing a search engine by employing hybrid training data with web rankers. The system 200 can include the sorting component 102 that can combine the use of the first ranker 104 and the second ranker 106 in order to provide search results for a query in a language to which a ranker has not been sufficiently trained. The sorting component 102, the first ranker 104, and/or the second ranker 106 can be implemented with any suitable language. For example, the language can be, but is not limited to being, English, Chinese, Spanish, French, Portuguese, Indonesian/Malay, Swahili, German, Russian, Japanese, Bengali, Hindi, Urdu, Arabic, Punjabi, Persian, any suitable language that enables written or verbal communication, etc.

The sorting component 102 can include the first ranker 104 trained with data for a language and the second ranker 106 that is trained with limited amount of data (e.g., experimentally proven). By combining and utilizing both the first ranker 104 and the second ranker 106, ranked search results 108 can be identified and delivered for the query. It is to be appreciated that a ranker (e.g., the first ranker 104, the second ranker 106, etc.) can enable the identification of relevant information for a query. A ranker can receive a query and, from data (e.g., uniform resource locators (URLs), web documents, etc.), compute a feature vector that depends on the query and the data, URLs, etc. The feature vector can include a bit that reflects that the query occurred in the data, URL, etc. The ranker can further create feature vectors with label data that includes a number for relevancy (e.g., the higher the number, the more relevant). The ranker can leverage this data to attach a score to the feature vectors and provide sorting to provide the highest rank (e.g., higher score reflective of being relevant). It is to be appreciated that the labels may not be attached by the ranker but are created usually by humans, and are used to teach the ranker how to rank. It is to be appreciated that the subject innovation can be extended to include labels created by machines, computers, and the like.

The system 200 can further include a search engine 202 that can leverage the sorting component 102 in order to generate search results for a query, wherein the search results relate to relevant data from, for example, the Internet 204. It is to be appreciated that the search engine 202 can be any suitable search engine, search component, browser, website, and the like. In general, the search engine 202 can process a query to identify data hosted by the Internet 204 and/or any other electronic resource (e.g., computer, server, network, database, etc.). Moreover, as depicted, the sorting component 102 can be a stand-alone component that the search engine can utilize in order to enhance the generation of search results for a query.

Figure 3:
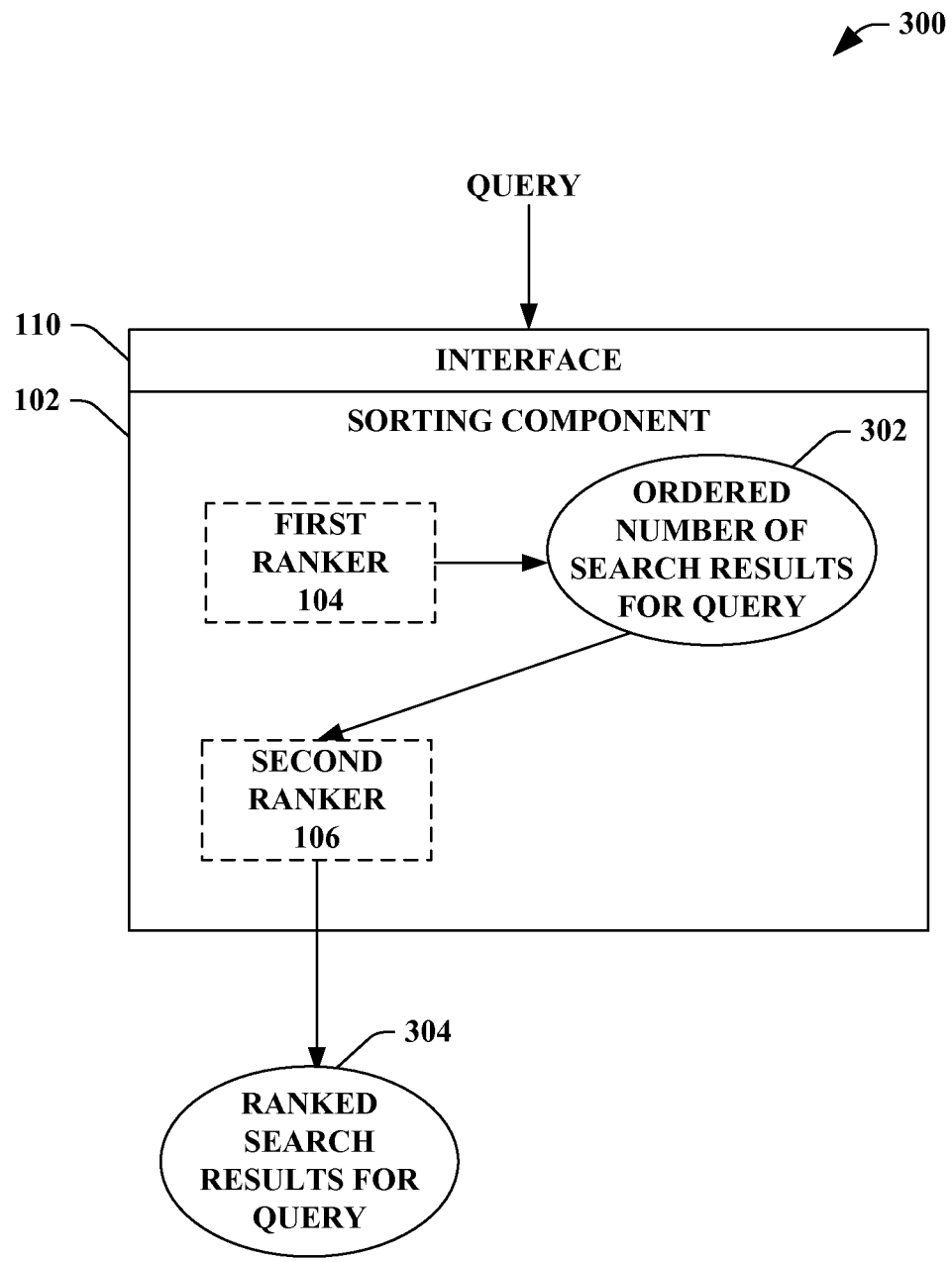
FIG. 3 illustrates a block diagram of an exemplary system that facilitates generating query results for a language with a first ranker and a second ranker.

FIG. 3 illustrates a system 300 that facilitates generating query results for a language with a first ranker and a second ranker. The system 300 can include the sorting component 102 that can provide cascading ranking structures built using a hybrid training data set, wherein the hybrid training data set is a first set of training data used to sufficiently train the first ranker 104 and a second set of training data that is limited and used to train the second ranker 106 (limited being determined e.g. experimentally). Typically, the second ranker 106 may not provide accurate or relevant search results for a received query since the second ranker 106 is not trained with sufficient amount of data. However, by combining the second ranker 106 with the trained and proven first ranker 104, the deficiencies of the second ranker 106 can be overcome.

The interface 110 can receive a query in a first language, wherein the second ranker 106 can be related to such first language but lacks being trained or fully trained or experimentally proven to provide relevant search results. In light of such lack of training, the sorting component 102 can leverage the first ranker 104 (e.g., the trained ranker) to provide relevant ordered search results, yet, for a second (disparate) language. The first ranker 104 can be invoked on the received query to generate an ordered number of search results for the query 302. A pre-defined number of the ordered number of search results 302 can be used to invoke with the second ranker 106 (e.g., the untrained or partially trained ranker). By implementing the second ranker 106 with a subset of the search results 302 generated by the first ranker 104, the ordered search results 302 can be re-ranked and ordered to provide ranked search results for the query 304 for the appropriate language.

The system 300 can use cascading ranking structures built using a hybrid training set as a solution for building rankers for languages for which there is not enough search relevance training data. The subject innovation can build a ranker for web documents for a language (referred to as Lang1) for which there is not enough data. On the other hand, an available ranker can be trained using data from another language (referred to as Lang2). A query can be issued in Lang1 and a Lang2Ranker (ranker related to the Lang2) can be invoked to order the search results. It is to be appreciated that the results could be unsatisfactory since there is a mismatch between training data and the data used at query time. However, the system 300 can take the top results (e.g., a pre-defined number of results) obtained using the Lang2Ranker (e.g. top 30 results) and reorder such results based on a ranker specifically trained from the "limited" amount of Lang1 training data (e.g., Lang1Ranker-ranker related to Lang1).

By employing this cascading ranking structure, the results returned from a generic ranker (e.g., Lang2Ranker) can be reasonable (experimentally proven) wherein the ordering of the top results may be at issue. Yet, to re-order the top results, less training data is needed to order the full set of results. Hence, a generic ranker (Lang2Ranker) can be invoked for ranking all results and a more specific trained ranker (Lang1Ranker) can be invoked for top results. The employment of the proposed ranking cascade architecture can be highly scalable to other languages since it does not require full re-training of rankers for each language, rather a much smaller training set for the new language is needed to enable the re-ordering of top search results.

Figure 4:
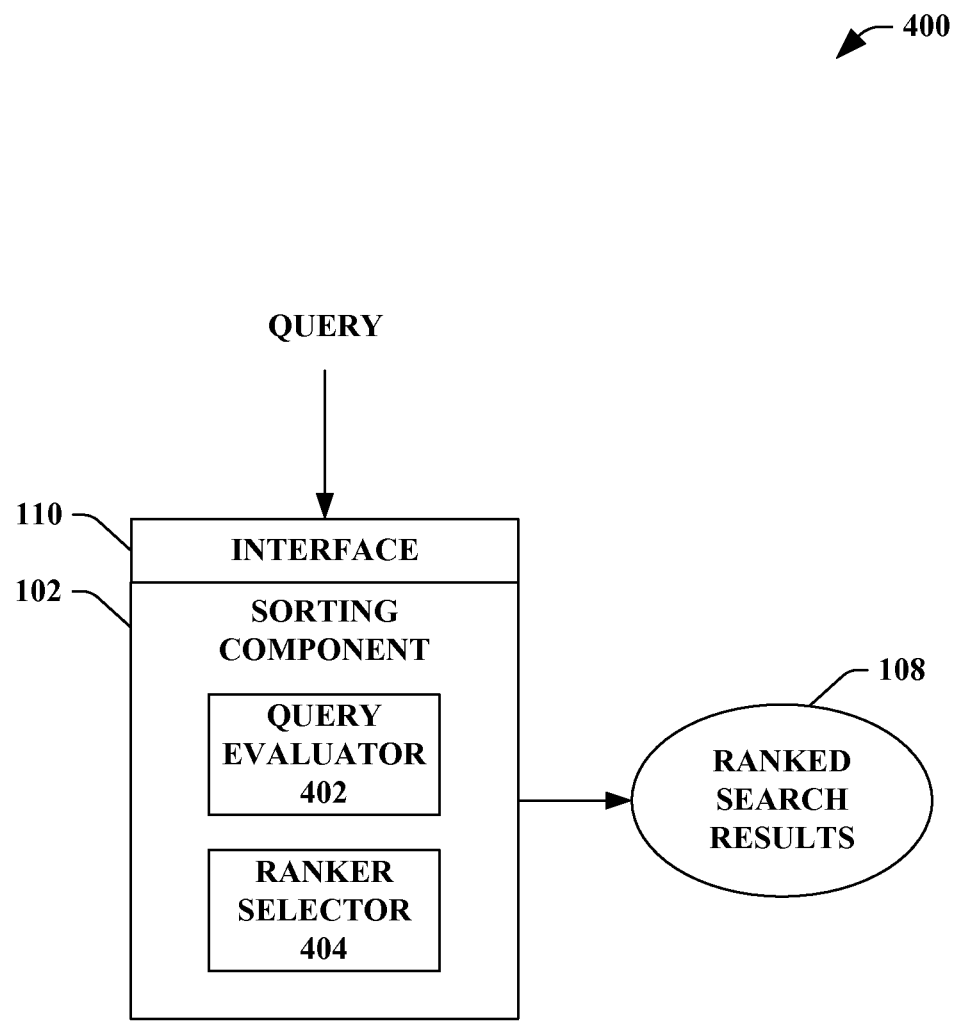
FIG. 4 illustrates a block diagram of an exemplary system that facilitates evaluating a received query to identify a first language ranker and a second language ranker to generate ranked search results.

FIG. 4 illustrates a system 400 that facilitates evaluating a received query to identify a first language ranker and a second language ranker to generate ranked search results. The system 400 can include the sorting component 102 that can evaluate a received query in order to ascertain whether a cascading ranking structure can be employed for the query in order to provide accurate and relevant search results. In general, the sorting component 102 can evaluate various languages and associated rankers to ascertain whether or not a query and language pair includes a sufficiently trained ranker for such language. If the query and language pair does not include a ranker that is sufficiently trained or partially trained, the sorting component 102 can utilize a cascading ranking structure technique in which at least two rankers are combined to provide relevant and ranked search results 108.

The sorting component 102 can include a query evaluator 402 that can examine the received query in order to identify a language related therewith. In other words, the query evaluator 402 can ascertain the language to which a query is received (e.g., written, spoken, typed, etc.). For example, the query evaluator 402 can leverage an originating Internet Protocol (IP) address to identify a language, market, or market segment. Based upon the identified language of the query, the sorting component 102 can employ a cascading ranking structure if a ranker for such language has not been trained, is untrained, is not experimentally proven, or is partially untrained. The sorting component 102 can further include a ranker selector 404 that can select at least two rankers (e.g., a first ranker and a second ranker) based upon the evaluation of the received query (e.g., identifying the language to which the query is received).

For example, based upon the identified language of the query, the ranker selector 404 can ascertain whether a cascading ranking structure technique can be employed. It is to be appreciated that the system 400 can implement the combination of a first ranker and a second ranker if the identified query language does not include or correspond to a ranker that has been sufficiently trained. The ranker selector 404 can select a second ranker that corresponds to the identified query language (to which insufficient training data exists) and a first ranker that corresponds to a disparate language and include sufficient training data (e.g., experimentally proven). In general, if the received language for the query corresponds to a ranker (in such language) that is insufficiently trained, a sufficiently trained ranker can be utilized in a cascading technique as described. In other words, at least two rankers can be combined by the sorting component 102 to provide ranked search results 108.

Figure 5:
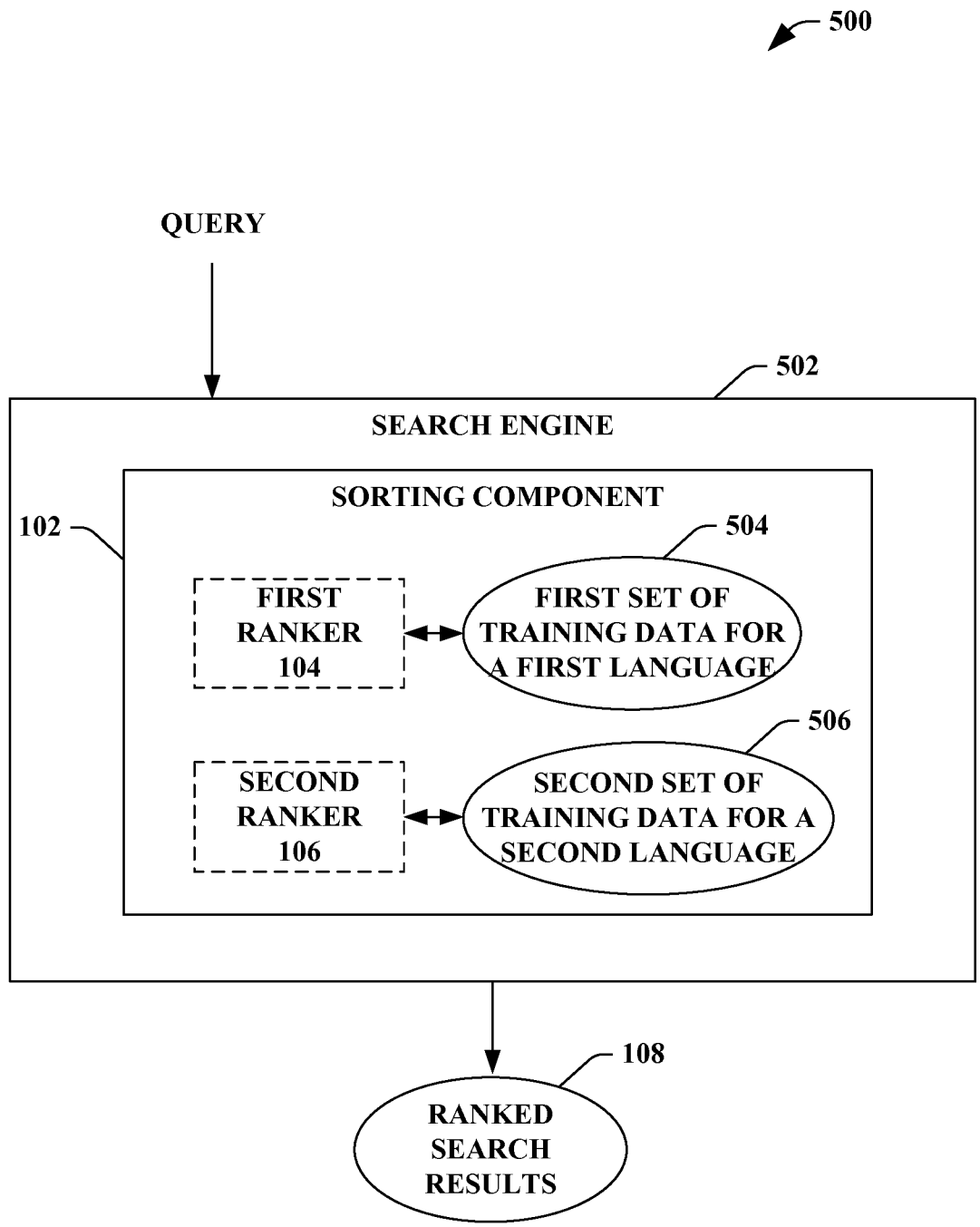
FIG. 5 illustrates a block diagram of exemplary system that facilitates incorporating cascading ranking structures built using hybrid training data within a search engine.

FIG. 5 illustrates a system 500 that facilitates incorporating cascading ranking structures built using hybrid training data within a search engine. The system 500 can include a search engine 502 that can provide relevant and ordered (e.g., hierarchy or ranked based on relevance) search results for a received query. The search engine 502 can include the sorting component 102. It is to be appreciated that the sorting component 102 can be a stand-alone component, incorporated into the search engine 502, and/or any suitable combination thereof. Moreover, as described, the sorting component 102 can enhance searching and querying of data in the event a ranker for the language of the received query has not been sufficiently trained. It is to be appreciated and understood that the system 500 utilizes the training data to obtain the rankers. Once the rankers are obtained, such rankers can be utilized to order search results.

The sorting component 102 can implement a cascading technique for rankers in which the first ranker 104 and the second ranker 106 can be combined to provide ranked search results 108. In particular, the first ranker 104 is trained using a first set of training data for a first language (e.g., the first language is disparate from the language related to the received query). Moreover, the second ranker 106 is trained using a second set of training data for a second language (e.g., the second language is the language related to the received query). It is to be appreciated that the first set of training data is larger than the second set of training data, wherein the second set of training data is an amount that insufficiently trains such ranker to provide accurate search results.

Figure 6:
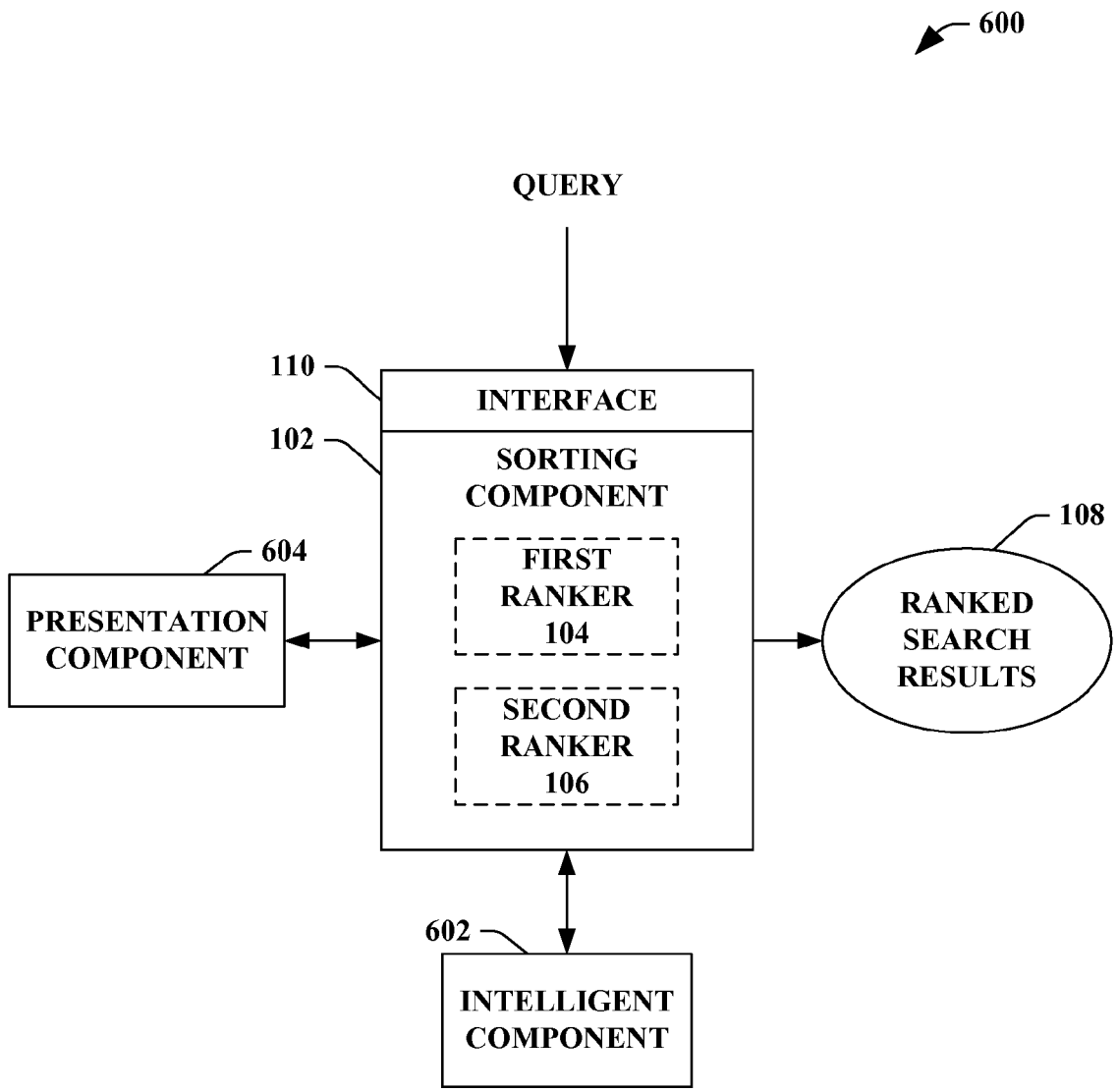
FIG. 6 illustrates a block diagram of an exemplary system that facilitates automatically selecting and implementing two language rankers to provide search results.

FIG. 6 illustrates a system 600 that employs intelligence to facilitate automatically selecting and implementing two language rankers to provide search results. The system 600 can include the sorting component 102, the first ranker 104, the second ranker 106, the ranked search results 108 which can be substantially similar to respective components, rankers, and results described in previous figures. The system 600 further includes an intelligent component 602. The intelligent component 602 can be utilized by the sorting component 102 to facilitate generating accurate and relevant search results utilizing at least two rankers. For example, the intelligent component 602 can infer query languages, ranker selection (e.g., selecting a ranker sufficiently trained for a language different than the query language), determination of whether a combined cascading ranker structure can be implementing (e.g., evaluating the rankers available for the query language to determine if sufficiently trained), the pre-defined amount of the order search results from the first ranker (e.g., selecting an optimal amount of search results to invoke into the second ranker 106), etc.

The intelligent component 602 can employ value of information (VOI) computation in order to identify a first ranker and a second ranker to employ to provide search results. For instance, by utilizing VOI computation, the most ideal and/or appropriate ranker(s) can be determined (e.g., selecting a ranker related to a non-query language, selecting a ranker for the query language, etc). Moreover, it is to be understood that the intelligent component 602 can provide for reasoning about or infer states of the system, environment, and/or user from a set of observations as captured via events and/or data. Inference can be employed to identify a specific context or action, or can generate a probability distribution over states, for example. The inference can be probabilistic—that is, the computation of a probability distribution over states of interest based on a consideration of data and events. Inference can also refer to techniques employed for composing higher-level events from a set of events and/or data. Such inference results in the construction of new events or actions from a set of observed events and/or stored event data, whether or not the events are correlated in close temporal proximity, and whether the events and data come from one or several event and data sources. Various classification (explicitly and/or implicitly trained) schemes and/or systems (e.g., support vector machines, neural networks, expert systems, Bayesian belief networks, fuzzy logic, data fusion engines . . . ) can be employed in connection with performing automatic and/or inferred action in connection with the claimed subject matter.

A classifier is a function that maps an input attribute vector, x=(x1, x2, x3, x4, xn), to a confidence that the input belongs to a class, that is, f(x)=confidence(class). Such classification can employ a probabilistic and/or statistical-based analysis (e.g., factoring into the analysis utilities and costs) to prognose or infer an action that a user desires to be automatically performed. A support vector machine (SVM) is an example of a classifier that can be employed. The SVM operates by finding a hypersurface in the space of possible inputs, which hypersurface attempts to split the triggering criteria from the non-triggering events. Intuitively, this makes the classification correct for testing data that is near, but not identical to training data. Other directed and undirected model classification approaches include, e.g., naïve Bayes, Bayesian networks, decision trees, neural networks, fuzzy logic models, and probabilistic classification models providing different patterns of independence can be employed. Classification as used herein also is inclusive of statistical regression that is utilized to develop models of priority.

The sorting component 102 can further utilize a presentation component 604 that provides various types of user interfaces to facilitate interaction between a user and any component coupled to the sorting component 102. As depicted, the presentation component 604 is a separate entity that can be utilized with the sorting component 102. However, it is to be appreciated that the presentation component 604 and/or similar view components can be incorporated into the sorting component 102 and/or a stand-alone unit. The presentation component 604 can provide one or more graphical user interfaces (GUIs), command line interfaces, and the like. For example, a GUI can be rendered that provides a user with a region or means to load, import, read, etc., data, and can include a region to present the results of such. These regions can comprise known text and/or graphic regions comprising dialogue boxes, static controls, drop-down-menus, list boxes, pop-up menus, as edit controls, combo boxes, radio buttons, check boxes, push buttons, and graphic boxes. In addition, utilities to facilitate the presentation such as vertical and/or horizontal scroll bars for navigation and toolbar buttons to determine whether a region will be viewable can be employed. For example, the user can interact with one or more of the components coupled and/or incorporated into the sorting component 102.

The user can also interact with the regions to select and provide information via various devices such as a mouse, a roller ball, a touchpad, a keypad, a keyboard, a touch screen, a pen and/or voice activation, a body motion detection, for example. Typically, a mechanism such as a push button or the enter key on the keyboard can be employed subsequent entering the information in order to initiate the search. However, it is to be appreciated that the claimed subject matter is not so limited. For example, merely highlighting a check box can initiate information conveyance. In another example, a command line interface can be employed. For example, the command line interface can prompt (e.g., via a text message on a display and an audio tone) the user for information via providing a text message. The user can then provide suitable information, such as alpha-numeric input corresponding to an option provided in the interface prompt or an answer to a question posed in the prompt. It is to be appreciated that the command line interface can be employed in connection with a GUI and/or API. In addition, the command line interface can be employed in connection with hardware (e.g., video cards) and/or displays (e.g., black and white, EGA, VGA, SVGA, etc.) with limited graphic support, and/or low bandwidth communication channels.

Figure 7:
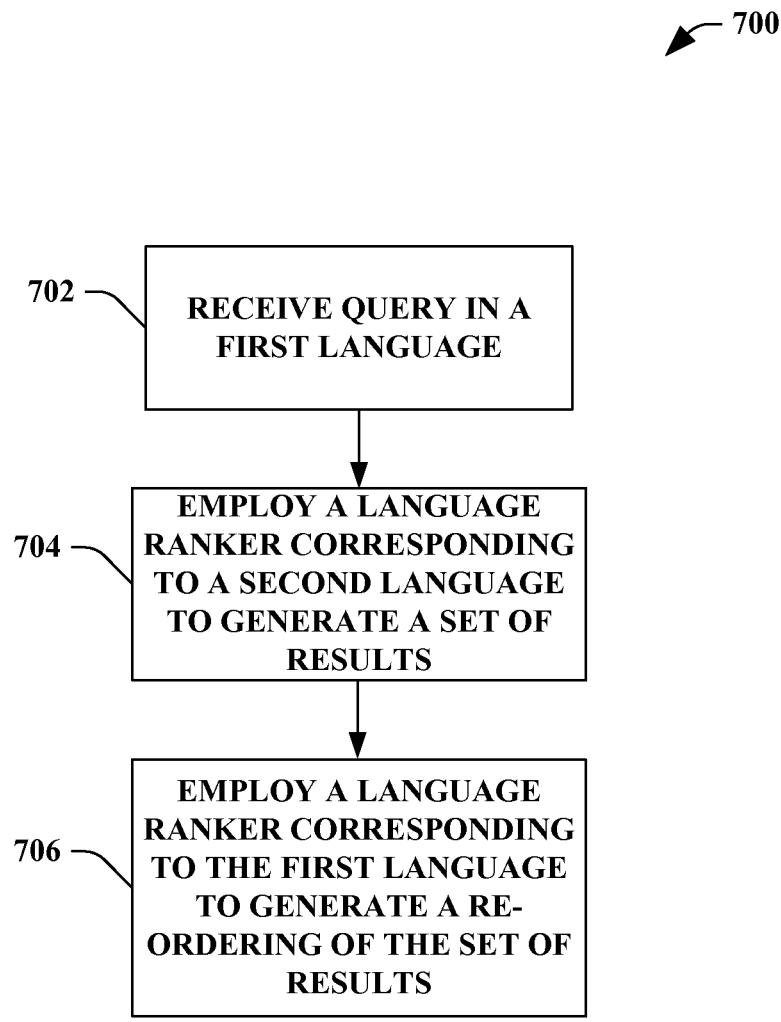
FIG. 7 illustrates an exemplary methodology for identifying search results for a query utilizing cascading ranking structures.
Figure 8:
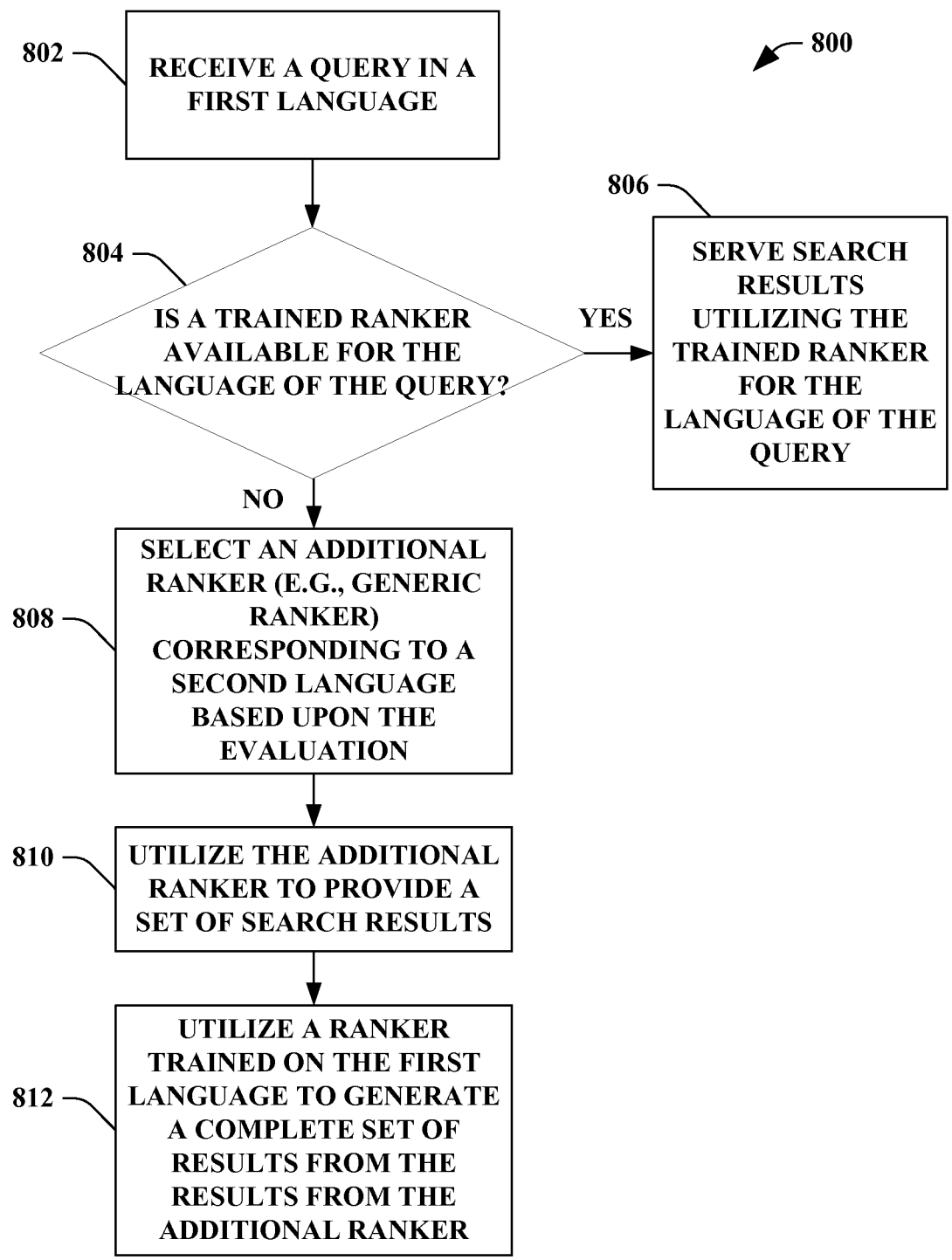
FIG. 8 illustrates an exemplary methodology that facilitates generating query results for a language with a first ranker and a second ranker.

FIGS. 7-8 illustrate methodologies and/or flow diagrams in accordance with the claimed subject matter. For simplicity of explanation, the methodologies are depicted and described as a series of acts. It is to be understood and appreciated that the subject innovation is not limited by the acts illustrated and/or by the order of acts. For example acts can occur in various orders and/or concurrently, and with other acts not presented and described herein. Furthermore, not all illustrated acts may be required to implement the methodologies in accordance with the claimed subject matter. In addition, those skilled in the art will understand and appreciate that the methodologies could alternatively be represented as a series of interrelated states via a state diagram or events. Additionally, it should be further appreciated that the methodologies disclosed hereinafter and throughout this specification are capable of being stored on an article of manufacture to facilitate transporting and transferring such methodologies to computers. The term article of manufacture, as used herein, is intended to encompass a computer program accessible from any computer-readable device, carrier, or media.

FIG. 7 illustrates a method 700 that facilitates identifying search results for a query utilizing cascading ranking structures. At reference numeral 702, a query in a first language can be received. It is to be appreciated that the query can be in any suitable language that enables communication (e.g., spoken, written, sign language, etc.) between users. At reference numeral 704, a language ranker corresponding to a second language can be employed to generate a set of search results. It is to be appreciated that the language ranker corresponding to the second language can be sufficiently trained and experimentally proven to provide accurate and relevant search results. At reference numeral 706, a language ranker corresponding to the first language (e.g., the language corresponding to the received query) can be employed to generate a re-ranking of the set of the search results. In other words, set of results generated by the language ranker of the second language can be utilized with the language ranker related to the first language in order to provide an accurate and relevant set of search results for the query in the appropriate language. It is to be appreciated that the methodology 700 can be extended to more than two rankers. For example, two cascade rankers can be utilized for a language (e.g., different from that of the query) and then a ranker trained on the language of the query.

FIG. 8 illustrates a method 800 for generating query results for a language with a first ranker and a second ranker. At reference numeral 802, a query can be received in a first language. It is to be appreciated that the query can be any suitable query related to a search for data hosted by a computer, a server, a network, the Internet, a data store, a database, etc. At reference numeral 804, a determination is made whether or not a ranker that is sufficiently trained in the first language is available. If a ranker is available, the methodology 800 continues at reference numeral 806. If a ranker is not available, the methodology 800 continues at reference numeral 808. For example, a ranker corresponding to the first language can be evaluated to ascertain if the ranker is sufficiently trained (e.g., experimentally proven to provide relevant search results for a query). At reference numeral 806, search results are served utilizing the trained ranker for the language of the query. At reference numeral 808, an additional ranker (e.g., a generic ranker) corresponding to a second language can be selected based upon the evaluation/determination. In particular, the additional ranker can be a ranker that is not experimentally proven and has not been trained with a sufficient amount of data (e.g., insufficient amount of data). At reference numeral 810, the additional ranker can be utilized to provide a set of search results. At reference numeral 812, a ranker trained on the first language can be utilized to generate a complete set of results from the results received from the additional ranker. In other words, the additional ranker related to a second language can provide a first set of search results and the ranker related to the first language (e.g., the language corresponding to the received query) can be invoked on the first set of search results to generate a complete set of relevant and ordered search results.

Figure 9:
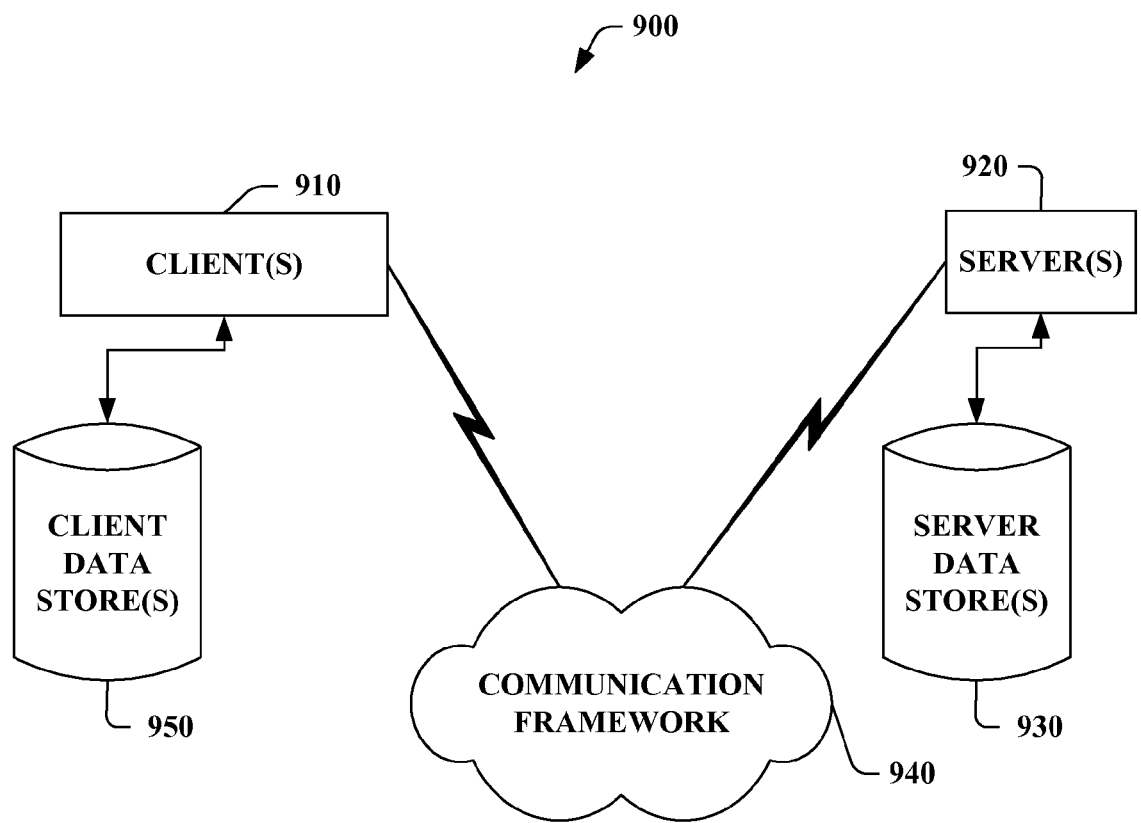
FIG. 9 illustrates an exemplary networking environment, wherein the novel aspects of the claimed subject matter can be employed.
Figure 10:
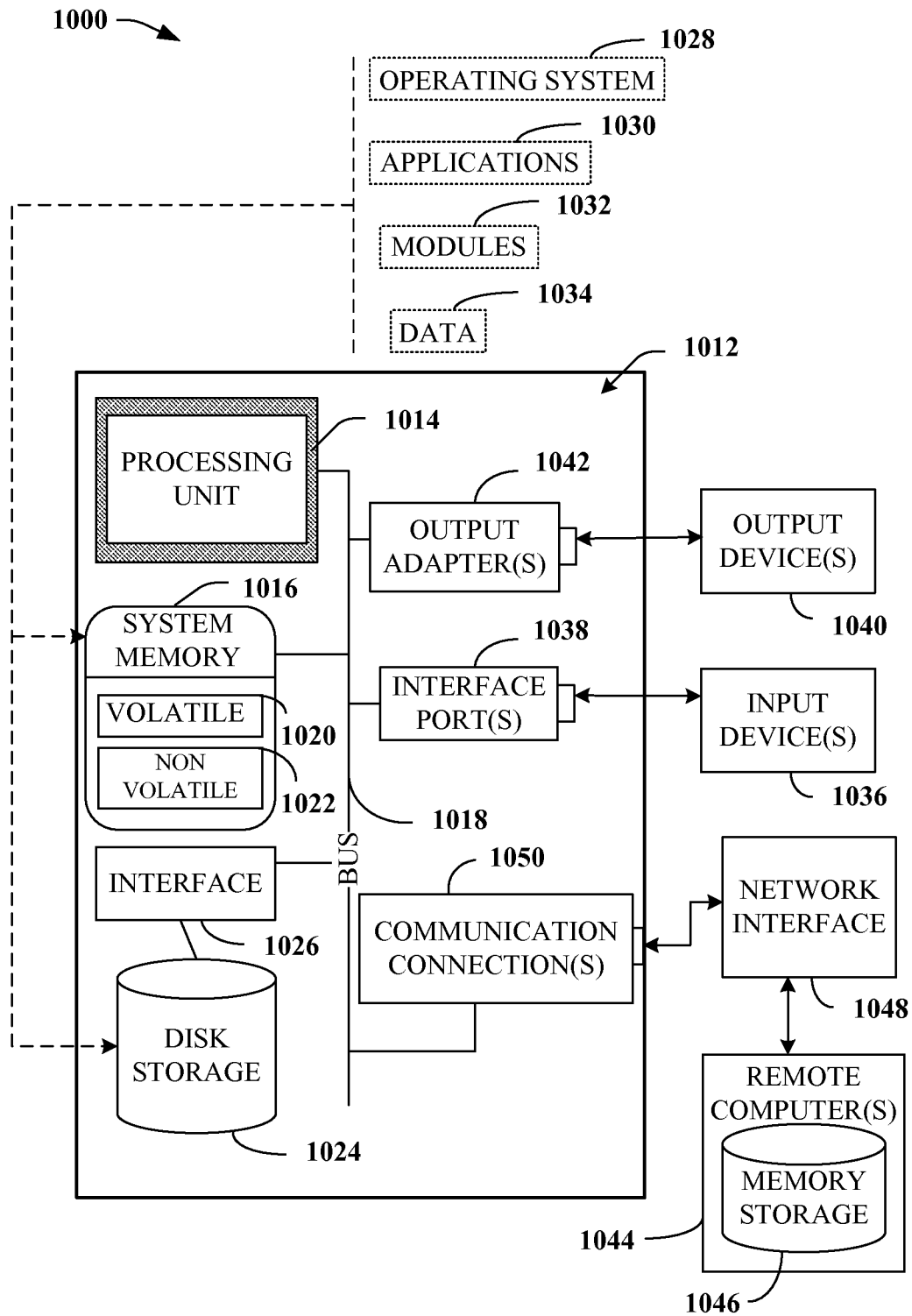
FIG. 10 illustrates an exemplary operating environment that can be employed in accordance with the claimed subject matter.

In order to provide additional context for implementing various aspects of the claimed subject matter, FIGS. 9-10 and the following discussion is intended to provide a brief, general description of a suitable computing environment in which the various aspects of the subject innovation may be implemented. For example, a sorting component that employs cascading ranking structures built using hybrid training data to generate ranked search results, as described in the previous figures, can be implemented in such suitable computing environment. While the claimed subject matter has been described above in the general context of computer-executable instructions of a computer program that runs on a local computer and/or remote computer, those skilled in the art will recognize that the subject innovation also may be implemented in combination with other program modules. Generally, program modules include routines, programs, components, data structures, etc., that perform particular tasks and/or implement particular abstract data types.

Moreover, those skilled in the art will appreciate that the inventive methods may be practiced with other computer system configurations, including single-processor or multi-processor computer systems, minicomputers, mainframe computers, as well as personal computers, hand-held computing devices, microprocessor-based and/or programmable consumer electronics, and the like, each of which may operatively communicate with one or more associated devices. The illustrated aspects of the claimed subject matter may also be practiced in distributed computing environments where certain tasks are performed by remote processing devices that are linked through a communications network. However, some, if not all, aspects of the subject innovation may be practiced on stand-alone computers. In a distributed computing environment, program modules may be located in local and/or remote memory storage devices.

FIG. 9 is a schematic block diagram of a sample-computing environment 900 with which the claimed subject matter can interact. The system 900 includes one or more client(s) 910. The client(s) 910 can be hardware and/or software (e.g., threads, processes, computing devices). The system 900 also includes one or more server(s) 920. The server(s) 920 can be hardware and/or software (e.g., threads, processes, computing devices). The servers 920 can house threads to perform transformations by employing the subject innovation, for example.

One possible communication between a client 910 and a server 920 can be in the form of a data packet adapted to be transmitted between two or more computer processes. The system 900 includes a communication framework 940 that can be employed to facilitate communications between the client(s) 910 and the server(s) 920. The client(s) 910 are operably connected to one or more client data store(s) 950 that can be employed to store information local to the client(s) 910. Similarly, the server(s) 920 are operably connected to one or more server data store(s) 930 that can be employed to store information local to the servers 920.

With reference to FIG. 10, an exemplary environment 1000 for implementing various aspects of the claimed subject matter includes a computer 1012. The computer 1012 includes a processing unit 1014, a system memory 1016, and a system bus 1018. The system bus 1018 couples system components including, but not limited to, the system memory 1016 to the processing unit 1014. The processing unit 1014 can be any of various available processors. Dual microprocessors and other multiprocessor architectures also can be employed as the processing unit 1014.

The system bus 1018 can be any of several types of bus structure(s) including the memory bus or memory controller, a peripheral bus or external bus, and/or a local bus using any variety of available bus architectures including, but not limited to, Industrial Standard Architecture (ISA), Micro-Channel Architecture (MSA), Extended ISA (EISA), Intelligent Drive Electronics (IDE), VESA Local Bus (VLB), Peripheral Component Interconnect (PCI), Card Bus, Universal Serial Bus (USB), Advanced Graphics Port (AGP), Personal Computer Memory Card International Association bus (PCMCIA), Firewire (IEEE 1394), and Small Computer Systems Interface (SCSI).

The system memory 1016 includes volatile memory 1020 and nonvolatile memory 1022. The basic input/output system (BIOS), containing the basic routines to transfer information between elements within the computer 1012, such as during start-up, is stored in nonvolatile memory 1022. By way of illustration, and not limitation, nonvolatile memory 1022 can include read only memory (ROM), programmable ROM (PROM), electrically programmable ROM (EPROM), electrically erasable programmable ROM (EEPROM), or flash memory. Volatile memory 1020 includes random access memory (RAM), which acts as external cache memory. By way of illustration and not limitation, RAM is available in many forms such as static RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), Rambus direct RAM (RDRAM), direct Rambus dynamic RAM (DRDRAM), and Rambus dynamic RAM (RDRAM).

Computer 1012 also includes removable/non-removable, volatile/non-volatile computer storage media. FIG. 10 illustrates, for example a disk storage 1024. Disk storage 1024 includes, but is not limited to, devices like a magnetic disk drive, floppy disk drive, tape drive, Jaz drive, Zip drive, LS-100 drive, flash memory card, or memory stick. In addition, disk storage 1024 can include storage media separately or in combination with other storage media including, but not limited to, an optical disk drive such as a compact disk ROM device (CD-ROM), CD recordable drive (CD-R Drive), CD rewritable drive (CD-RW Drive) or a digital versatile disk ROM drive (DVD-ROM). To facilitate connection of the disk storage devices 1024 to the system bus 1018, a removable or non-removable interface is typically used such as interface 1026.

It is to be appreciated that FIG. 10 describes software that acts as an intermediary between users and the basic computer resources described in the suitable operating environment 1000. Such software includes an operating system 1028. Operating system 1028, which can be stored on disk storage 1024, acts to control and allocate resources of the computer system 1012. System applications 1030 take advantage of the management of resources by operating system 1028 through program modules 1032 and program data 1034 stored either in system memory 1016 or on disk storage 1024. It is to be appreciated that the claimed subject matter can be implemented with various operating systems or combinations of operating systems.

A user enters commands or information into the computer 1012 through input device(s) 1036. Input devices 1036 include, but are not limited to, a pointing device such as a mouse, trackball, stylus, touch pad, keyboard, microphone, joystick, game pad, satellite dish, scanner, TV tuner card, digital camera, digital video camera, web camera, and the like. These and other input devices connect to the processing unit 1014 through the system bus 1018 via interface port(s) 1038. Interface port(s) 1038 include, for example, a serial port, a parallel port, a game port, and a universal serial bus (USB). Output device(s) 1040 use some of the same type of ports as input device(s) 1036. Thus, for example, a USB port may be used to provide input to computer 1012, and to output information from computer 1012 to an output device 1040. Output adapter 1042 is provided to illustrate that there are some output devices 1040 like monitors, speakers, and printers, among other output devices 1040, which require special adapters. The output adapters 1042 include, by way of illustration and not limitation, video and sound cards that provide a means of connection between the output device 1040 and the system bus 1018. It should be noted that other devices and/or systems of devices provide both input and output capabilities such as remote computer(s) 1044.

Computer 1012 can operate in a networked environment using logical connections to one or more remote computers, such as remote computer(s) 1044. The remote computer(s) 1044 can be a personal computer, a server, a router, a network PC, a workstation, a microprocessor based appliance, a peer device or other common network node and the like, and typically includes many or all of the elements described relative to computer 1012. For purposes of brevity, only a memory storage device 1046 is illustrated with remote computer(s) 1044. Remote computer(s) 1044 is logically connected to computer 1012 through a network interface 1048 and then physically connected via communication connection 1050. Network interface 1048 encompasses wire and/or wireless communication networks such as local-area networks (LAN) and wide-area networks (WAN). LAN technologies include Fiber Distributed Data Interface (FDDI), Copper Distributed Data Interface (CDDI), Ethernet, Token Ring and the like. WAN technologies include, but are not limited to, point-to-point links, circuit switching networks like Integrated Services Digital Networks (ISDN) and variations thereon, packet switching networks, and Digital Subscriber Lines (DSL).

Communication connection(s) 1050 refers to the hardware/software employed to connect the network interface 1048 to the bus 1018. While communication connection 1050 is shown for illustrative clarity inside computer 1012, it can also be external to computer 1012. The hardware/software necessary for connection to the network interface 1048 includes, for exemplary purposes only, internal and external technologies such as, modems including regular telephone grade modems, cable modems and DSL modems, ISDN adapters, and Ethernet cards.

What has been described above includes examples of the subject innovation. It is, of course, not possible to describe every conceivable combination of components or methodologies for purposes of describing the claimed subject matter, but one of ordinary skill in the art may recognize that many further combinations and permutations of the subject innovation are possible. Accordingly, the claimed subject matter is intended to embrace all such alterations, modifications, and variations that fall within the spirit and scope of the appended claims.

In particular and in regard to the various functions performed by the above described components, devices, circuits, systems and the like, the terms (including a reference to a "means") used to describe such components are intended to correspond, unless otherwise indicated, to any component which performs the specified function of the described component (e.g., a functional equivalent), even though not structurally equivalent to the disclosed structure, which performs the function in the herein illustrated exemplary aspects of the claimed subject matter. In this regard, it will also be recognized that the innovation includes a system as well as a computer-readable medium having computer-executable instructions for performing the acts and/or events of the various methods of the claimed subject matter.

There are multiple ways of implementing the present innovation, e.g., an appropriate API, tool kit, driver code, operating system, control, standalone or downloadable software object, etc. which enables applications and services to use the advertising techniques of the invention. The claimed subject matter contemplates the use from the standpoint of an API (or other software object), as well as from a software or hardware object that operates according to the advertising techniques in accordance with the invention. Thus, various implementations of the innovation described herein may have aspects that are wholly in hardware, partly in hardware and partly in software, as well as in software.

The aforementioned systems have been described with respect to interaction between several components. It can be appreciated that such systems and components can include those components or specified sub-components, some of the specified components or sub-components, and/or additional components, and according to various permutations and combinations of the foregoing. Sub-components can also be implemented as components communicatively coupled to other components rather than included within parent components (hierarchical). Additionally, it should be noted that one or more components may be combined into a single component providing aggregate functionality or divided into several separate sub-components, and any one or more middle layers, such as a management layer, may be provided to communicatively couple to such sub-components in order to provide integrated functionality. Any components described herein may also interact with one or more other components not specifically described herein but generally known by those of skill in the art.

In addition, while a particular feature of the subject innovation may have been disclosed with respect to only one of several implementations, such feature may be combined with one or more other features of the other implementations as may be desired and advantageous for any given or particular application. Furthermore, to the extent that the terms "includes," "including," "has," "contains," variants thereof, and other similar words are used in either the detailed description or the claims, these terms are intended to be inclusive in a manner similar to the term "comprising" as an open transition word without precluding any additional or other elements.

What is claimed is:

1. A computer-implemented method that facilitates generating a search result for a received query, comprising:
   receiving a query in a first human language;
   evaluating a first language ranker that corresponds to the first human language to ascertain if the first language ranker satisfies one or more criteria to be classified as a trained ranker that is associated with a particular degree of training;
   upon ascertaining that the first language ranker does not satisfy the one or more criteria, selecting a second language ranker that corresponds to a second human language that is disparate from the first human language;
   upon selecting the second language ranker, employing the second language ranker to generate a set of search results for the received query; and
   employing the first language ranker to generate a re-ordering of the set of search results.

2. The method of claim 1, wherein the second language ranker is trained by a greater amount of training data than the first language ranker.

3. A system comprising:
   one or more processors;
   memory communicatively coupled to the one or more processors;
   an interface component maintained in the memory and executable by the one or more processors to receive a query in a first human language;

a first ranker maintained in the memory and executable by the one or more processors to generate ordered search results for the query, the first ranker being trained in a second human language; and a second ranker maintained in the memory and executable by the one or more processors to generate reordered search results from the ordered search results, the second ranker being trained in the first human language and being trained to a lesser degree in the first human language than the first ranker is trained in the second human language.

4. The system of claim 3, wherein at least one of the first ranker or the second ranker is trained based at least in part on input from a user that indicates a degree of relevance a search result has to a query.

5. The system of claim 3, wherein the second ranker is trained to a lesser degree than the first ranker due to an amount of training data that is used to train the second ranker being less than an amount of training data that is used to train the first ranker.

6. The system of claim 3, wherein the second ranker is configured to generate reordered search results by:
selecting a predefined number of top results of the ordered search results that were generated by the first ranker; and
reordering the selected results.

7. The system of claim 3, wherein at least one of the first ranker or the second ranker is configured to utilize a search engine to provide one or more search results.

8. The system of claim 3, further comprising a query evaluator maintained in the memory and executable by the one or more processors to identify the first language of the query based at least in part on an originating Internet Protocol (IP) address associated with the query.

9. The system of claim 3, wherein the query comprises at least one of a query in a written form or a query in a spoken form.

10. The system of claim 3, further comprising a ranker selector maintained in the memory and executable by the one or more processors to select at least one of the first ranker or the second ranker based at least in part on a language of the query.

11. The system of claim 10, wherein the ranker selector is configured to select the first ranker to generate the ordered search results based at least in part on an amount of training data that was used to train the first ranker.

12. The system of claim 3, wherein at least one of the first ranker or the second ranker is configured to utilize a feature vector to generate a relevancy score to provide at least one search result.

13. The system of claim 3, wherein the query relates to a data search associated with at least one of the Internet, a data store, a network, a website, or a server.

14. One or more computer storage media storing computer-readable instructions that, when executed, instruct one or more processors to perform acts comprising:
receiving a query in a first human language;
determining that a first ranker that is trained for the first human language does not satisfy one or more criteria to be classified as a trained ranker that is associated with a particular degree of training;
upon determining that the first ranker does not satisfy the one or more criteria, selecting a second ranker that is trained for a second human language, the second ranker being trained with a greater amount of training data than the first ranker;
utilizing the second ranker to generate a set of search results for the query;
utilizing the first ranker to reorder a predefined number of search results of the set of search results; and
providing the reordered search results.

15. The one or more computer storage media of claim 14, wherein the predefined number of search results of the set of search results comprises a number of top search results of the set of search results.

16. The one or more computer storage media of claim 14, wherein at least one of the first ranker or the second ranker utilizes a feature vector to generate a relevancy score to provide at least one search result.

17. The one or more computer storage media of claim 14, wherein the query relates to a data search associated with at least one of the Internet, a data store, a network, a website, or a server.

18. The one or more computer storage media of claim 14, wherein at least one of the first ranker or the second ranker is trained based at least in part on input from a user that indicates a degree of relevance a search result has to a query.

19. The one or more computer storage media of claim 14, wherein the second ranker is selected based at least in part on an amount of training data that was used to train the second ranker.

* * * * *